United States Patent Office.

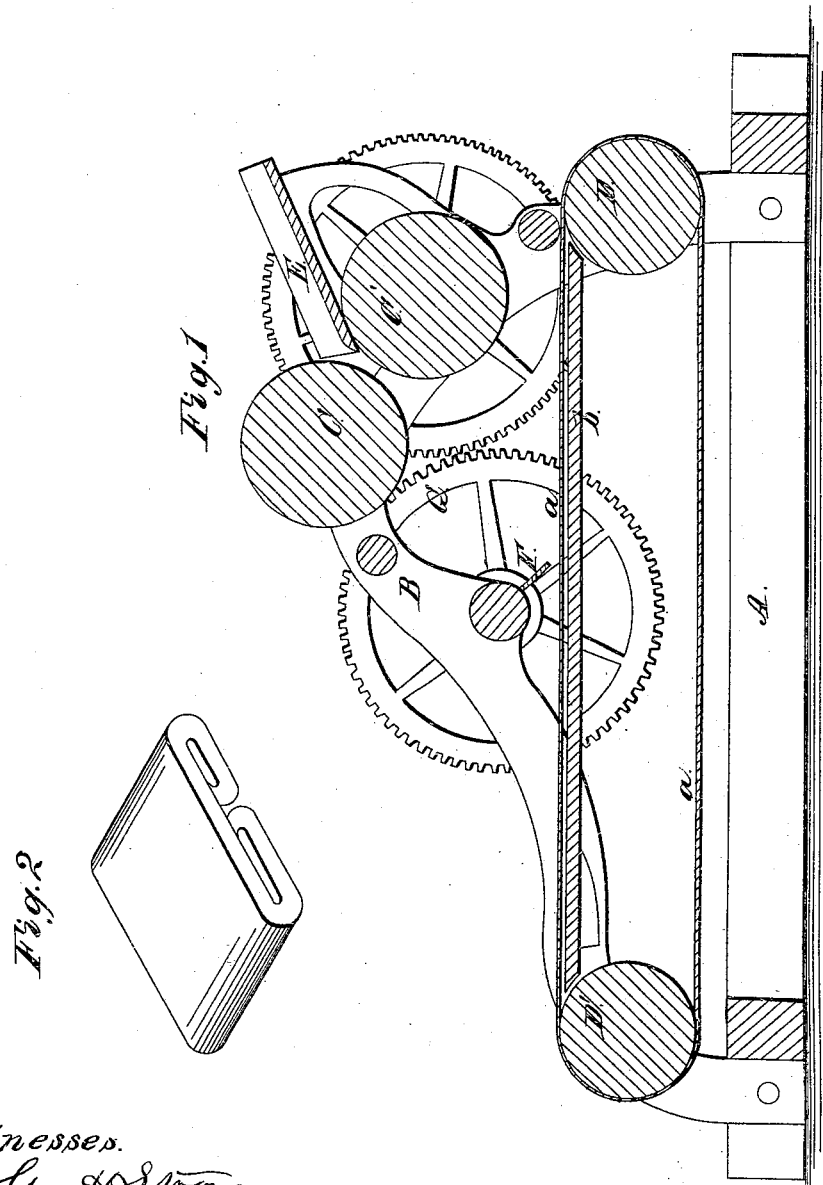

JOHN D'ARCY, OF SAN FRANCISCO, CALIFORNIA.

Letters Patent No. 70,971, dated November 19, 1867.

IMPROVED LOAF-BREAD MACHINE.

*The Schedule referred to in these Letters Patent and making part of the same.*

TO ALL WHOM IT MAY CONCERN:

Be it known that I, JOHN D'ARCY, of San Francisco, county of San Francisco, State of California, have invented an Improved Loaf-Bread Machine; and I do hereby declare the following description and accompanying drawings are sufficient to enable any person skilled in the art or science to which it most nearly appertains to make and use my said invention or improvement without further invention or experiment.

The nature of my invention is to provide an improved machine for rolling and cutting dough into the desired size for loaf-bread, and consists in constructing a machine with rollers or cylinders placed transversely across a platform operated by toothed wheels. An endless belt or apron revolves beneath the rollers, and a revolving knife in front of the rollers cuts the dough into the desired size at every revolution, and the endless belt carries it to the end of the machine, from whence it is taken and folded in such a manner that the gases are retained until it is ready for the oven.

To more fully describe my invention, reference is had to the accompanying drawing, and letters marked thereon, which shows a sectional side elevation.

A is a frame, to which curved standards or brackets, B B, are bolted. In these standards revolve the two crushing-rollers C C', operated by gear-wheels at one end of their axes. The endless belt $a$ moves below the crushing-rollers, and is operated by a gear-wheel on the end of one of the apron-rollers D. Between the lower crushing-roller and the apron-roller a pinion operates by means of a pulley, which moves the whole machinery, the endless apron having a roller, D', at the other end of the machine to support and keep it tight. A table, $b$, directly beneath the belt, supports it and resists the pressure of the knife when cutting the dough. The knife F, for cutting the sheets into the desired size, is placed in front of the crushing-rollers, so that the size of the piece of dough is governed by the circumference of the belt-roller D, or the speed of the knife. The knife is placed a little above the endless apron, so that at each revolution it presses upon the apron, and a piece is severed. This knife is operated by a toothed wheel geared to the lower-crushing-roller, and a similar wheel, G, attached to the end of the knife-shaft.

The dough is introduced to the rollers by a hopper, E E, constructed in the usual way, and is received between them, and passes through on to the endless apron, where it is cut by the knife F.

In order to prevent the gas from escaping during the fermenting process, the pieces are taken from the apron, and folded up by doubling the sides and ends over, so that the cut or severed edges are brought to the inside, and the gas thus confined, shown at Figure 2. After a sufficient time has elapsed, the pieces or loaves thus treated are placed in pans for baking.

Having thus described my invention, I am well aware that a machine, similar in some respects to that herein described, has been employed for cutting and docking dough for crackers. This device I do not claim; but what I do claim, and desire to secure by Letters Patent, is—

The combination and arrangement of the kneading-rollers C C', endless apron $a$, carried by the rollers D and D', and the rotating knife F, all as set forth.

In witness whereof I have hereunto set my hand and seal.

JOHN D'ARCY. [L. S.]

Witnesses:
GEO. H. STRONG,
J. L. BOONE.